Sept. 16, 1952
C. HALL
2,610,747
AUTOMOBILE LIFT
Filed May 2, 1951
2 SHEETS—SHEET 1
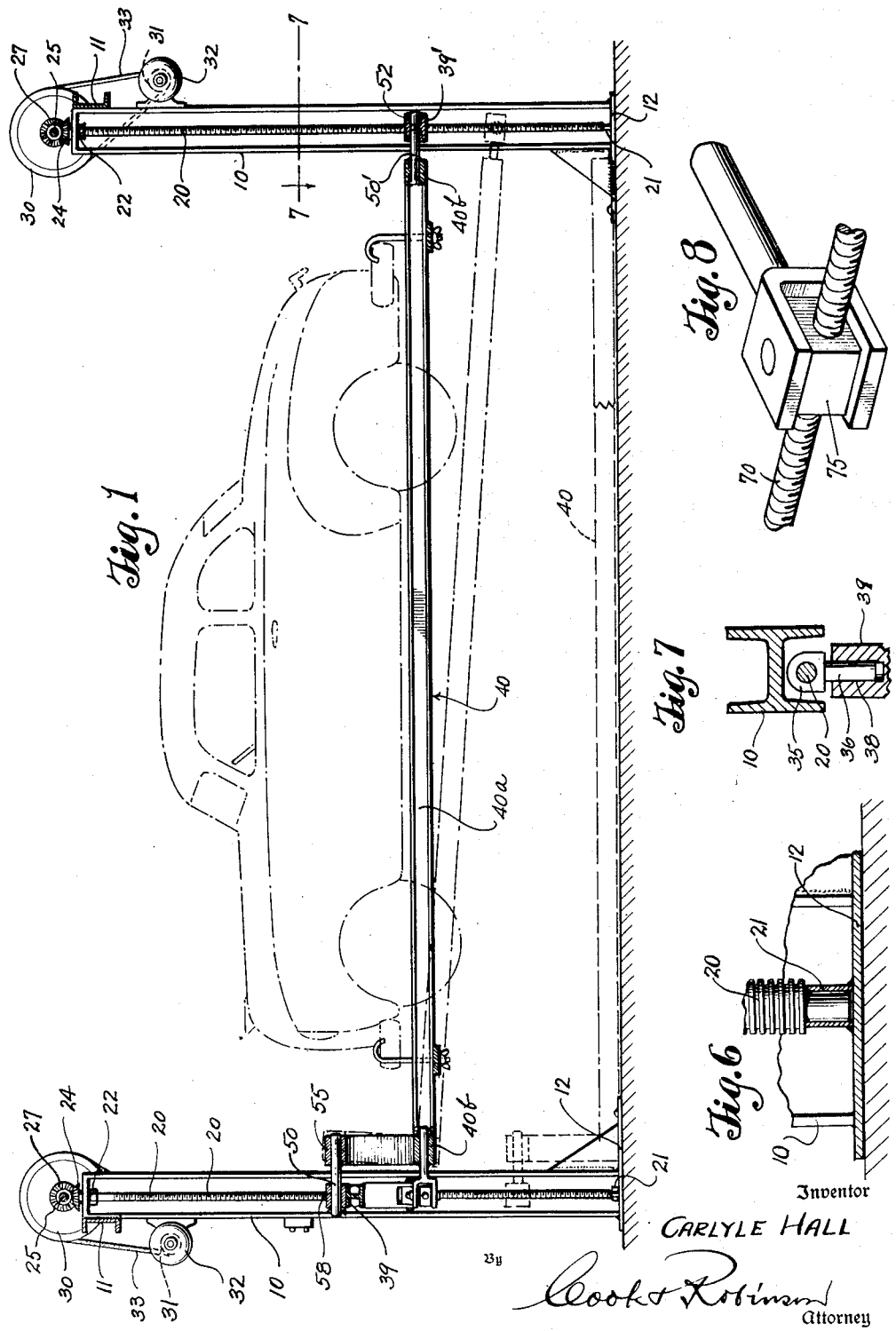
Inventor
CARLYLE HALL
By
Cook & Robinson
Attorney

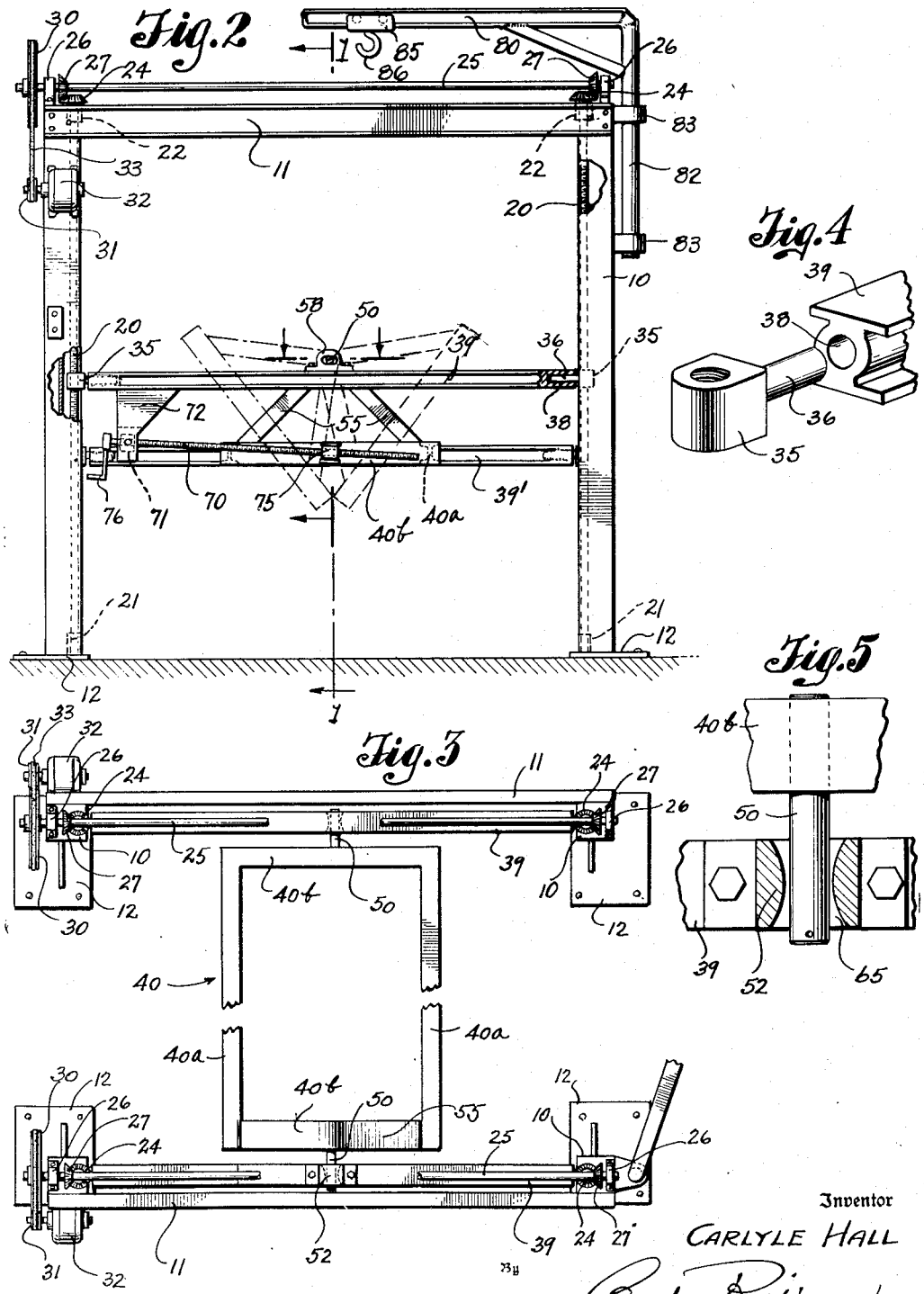

Patented Sept. 16, 1952

2,610,747

UNITED STATES PATENT OFFICE 2,610,747

AUTOMOBILE LIFT

Carlyle Hall, Berkeley, Calif.

Application May 2, 1951, Serial No. 224,163

5 Claims. (Cl. 214—1)

1

This invention relates to automobile lifts, and it has reference more particularly to lifts of the character of that of my co-pending application, filed on October 25, 1946, under Serial No. 705,707, which has matured into Patent Number 2,545,953, issued March 20, 1951, in which application I described and illustrated an automobile lifting means including a horizontal frame of rectangular form designed for the support and fixed securement of an automobile thereon, and which frame was equipped with hoisting devices at its opposite ends whereby it could be raised and lowered. Also, a means was illustrated therein for rotating the said horizontal frame in either direction about its central longitudinal axis for the purpose of turning the supported automobile on its side, thus to facilitate the performance of any repair job, adjustment or work, on parts at the underside of the automobile. The present invention is in the form of an improvement on the structure of the above application.

In the use of lifts made according to the disclosures of my co-pending application above mentioned, it has been found desirable to make certain improvements in the manner of and means for suspending the horizontal frame structure in order to maintain balance of the supported automobile in all of its various positions of rotative adjustment, thus to make such adjustment easier, and to permit the simplification of the construction of those parts designed for the support and rotative adjustment of the frame.

It is the principal object of the present invention to provide an automobile lift including a horizontal frame structure upon which an automobile may be positioned, secured and elevated to any suitable working height, and then rotated about a longitudinal axial line; this particular frame construction being characterized by the provision of trunnion supports at its opposite ends about which it may be rotated, and which trunnions are so related with respect to the level of the frame, that the axial line of rotation passes through or substantially through the center of gravity of the vehicle supported thereon.

It is a further object of this invention to provide a hoisting mechanism, as above stated, having an automobile lifting frame that may be lowered against a floor to permit the driving of the automobile onto or from position over it preparatory to being secured thereto.

It is also an object of the invention to provide a lifting frame on which the automobile may be secured, and which frame has a supporting trunnion at one end substantially elevated above that

2 at the other end so that the axial line of the trunnions will pass through the center of gravity of the automobile supported by the frame.

Still further objects of the invention reside in the details of construction and combination of parts for the support and adjustment of the frame, and in their mode of operation, as will hereinafter be fully described.

In accomplishing these and other objects of the invention, I have provided the improved details of construction, the preferred forms of which are illustrated in the accompanying drawings, wherein—

Fig. 1 is a central, vertical section of a hoist embodying the improvements of the present invention therein; the section being on line 1—1 in Fig. 2.

Fig. 2 is an end elevation of the hoist, as seen from the left hand end of Fig. 1, indicating certain rotary adjustments of the vehicle supporting frame.

Fig. 3 is a plan view of the hoist, the medial portion of the vehicle mounting frame thereof being broken out to shorten the view.

Fig. 4 is a perspective view, showing an end portion of one of the transverse lifting beams and the supporting bearing therefor.

Fig. 5 is a detail of one of the supporting trunnions of the vehicle lifting frame, and its bearing, as seen in cross-section.

Fig. 6 is a detail showing the lower end bearing for one of the frame hoisting screws.

Fig. 7 is a horizontal section through a corner post, taken on line 7—7 in Fig. 1.

Fig. 8 is a perspective view of parts of the tilting mechanism for the vehicle supporting frame.

Referring more in detail to the drawings—

In the present drawings, I have illustrated an automobile lift that may be considered to be portable, since it is not required that it be permanently fixed to a support or any parts thereof sunk into the ground below floor level. It comprises four upright corner posts 10, that define the limits or dimensions of the structure. The two posts at the ends of the frame, are joined across their upper ends by beams 11, as noted in Fig. 2, and the spacing of joined parts is such as to permit an automobile to pass between them to and from position on the hoisting frame. At their lower ends, the corner posts are welded to individual flat base plates 12, which are adapted to be bolted to the supporting floor if such is desired. The length of the structure as measured by the distance between posts located at opposite ends of the structure, is sufficient to receive an automobile between them as has been indicated in Fig. 1 by the showing of an automobile in dotted lines and if it is found desirable, the posts at opposite sides of the structure may be joined across their upper ends by beams in the same manner as the posts at the ends are joined, thus to add rigidity to the structure.

Each corner post 10 is of H-form in horizontal cross-section as best seen in Fig. 7, and those at the same end of the structure are placed with channeled sides faced toward each other. Erected in the channels at the insides of the four posts, are threaded lifting screws 20. At their lower ends these screw shafts are mounted to revolve in bearings 21 that are fixed on the base plates 12. At their upper ends, the shafts extend through bearings 22 at the upper ends of the posts 10, and each screw shaft is equipped at its upper end with a bevel gear wheel 24, by means of which it can be rotated; all gears being of the same size.

Mounted at the opposite ends of the structure, above the upper ends of the posts 10, are cross shafts 25—25, each being revolubly contained at its ends in mounting bearings 26—26. Keyed on each of the cross-shafts are bevel gear wheels 27 and 27 that mesh with the gear wheels 24 on the upper ends of the screw shafts 20. Each cross-shaft 25 has a belt wheel 30 fixed thereon at one end that is aligned with a relatively small pulley wheel 31 on the drive shaft of a small electric motor 32 mounted on an adjacent post 10. Belts 33 are applied over corresponding belt wheels 30 and 31 for the driving of the cross-shafts.

The electric motors are of the reversible kind and may be independently controlled or they may be operated in unison.

Threaded onto each of the hoisting screws is a nut 35 with a horizontal stub shaft 36 fixed rigidly therein. Nuts are applied to screws at the same end of the structure at the same level, as shown in Fig. 2, and the stub shafts thereof are rotatably contained in holes 38 bored horizontally in the opposite ends of cross-beams 39—39', that extend horizontally between corner posts at opposite ends of the frame. These cross beams are provided for the support of the vehicle hoisting frame which is disposed longitudinally of and centrally within the structure as provided by the corner posts and connecting members.

The hoisting frame, designated in its entirety by numeral 40, is normally horizontally disposed. It is formed by opposite side beams 40a—40a joined by opposite end beams 40b—40b. The open rectangular frame that is formed by these four beams is longer than the vehicles to be lifted and it can be lowered flatly against the floor surface, as indicated in dotted lines in Fig. 1, thus to provide that an automobile may be easily driven into the structure over the lifting frame.

At its opposite ends the hoisting frame is equipped with supporting trunnions 50—50'. The trunnion 50', which is the one shown at the right hand end in Fig. 1, extends from the medial portion of the adjacent end member 40b of the hoisting frame, and is revolubly contained in a bearing 52 in the cross-beam 39'. The trunnion 50 at the other end of the hoisting frame, is mounted in an upwardly extending bracket 55 that is fixed rigidly upon the adjacent end beam 40b of the hoisting frame. The trunnion 50 is located about sixteen inches above the level of trunnion 50' when the hoisting frame 40 is horizontally disposed, and it is rotatably contained in a bearing 58 fixed on the cross beam 39 centrally between its ends.

It will here be explained that when an automobile is to be hoisted, it is driven between end posts into position while the hoisting frame is disposed flatly on the floor. Then the hoisting frame is elevated by causing all four hoisting screws 20 to rotate in unison in the same direction. The vehicle moves onto and leaves the hoisting frame at the end opposite that on which the upstanding bracket 55 is secured in order to avoid interference by the bracket.

As the frame is elevated the longitudinal beams 40a—40a thereof come into contact with the cross-axles and the vehicle, and the vehicle is lifted off the floor. The next step is to securely clamp the automobile to the lifting frame and this is done preferably by use of clamp bolts 60 that have upper end hooks adapted to be applied over the longitudinal frame beams of the automobile, as indicated in Fig. 1, and have lower end portions extended through transverse cross bars 62 applied against the under sides of the hoisting frame, and are equipped with nuts whereby the clamps may be drawn tight.

After the automobile is thus secured to the hoisting frame, the frame can be elevated to any working height desired, and then can be rotated on its trunnion supports 50—50' to turn the vehicle on its side to facilitate working on its under side.

A feature of the present invention resides in the fact that by positioning the trunnion 50 above the level of the hoisting frame and trunnion 50', the axial line of rotation of the vehicle will pass substantially through the center of gravity of the vehicle, thus to overcome the tendency of tipping and make rotative adjustment easy. The vehicle, when properly balanced has a tendency to stay at any position to which it is adjusted. By way of explanation, it will be here added that the center of gravity of automobiles of different makes may vary to some extent. Therefore, the height of trunnion 50 above the level of the hoisting frame should be such as to best suit the average of the common types of vehicles. It is not desired that the invention be restricted in respect to dimensions or exact relationship of parts.

It is also a feature of the present invention that the frame 40 can be raised or lowered while held at a horizontal level, or either end can be elevated or lowered independently of the other end. To permit this the beams 39—39' are rotatably mounted by the stub shafts 36 that extend horizontally from the nuts 35.

It is also necessary that the trunnions 50—50' have certain freedom or looseness in their containing bearings 52 and 58 to permit the turning of the frame 40; this by reason of the offset arrangement of the trunnions. Therefore, the bearings are formed with openings 65 as shown in Fig. 5 which are flared toward opposite ends and permit the angular change of the trunnions relative to the axis of the bearing as the frame 40 is rotatably adjusted.

The means for effecting and retaining the frame 40 at any position is as shown in Fig. 2 wherein it is shown that one end of a threaded adjusting shaft 70 is rotatably fixed in a bearing block 71 pivotally secured in a bracket 72 that depends from one end of the cross-beam 39. The other end of the shaft 70 is threaded through a block 75 that is pivotally fixed in the adjacent beam 40b of frame 40. A hand crank 76 is fixed on the outer end of shaft 70. Thus, when shaft 70 is rotated, the block 75 is moved therealong to swing the frame 40 about the trunnions accordingly to one side or the other as indicated by the dotted line positions of the frame in Fig. 2.

The particular advantage of the present construction resides in the fact that at any of the various positions of rotary adjustment, the vehicle will be substantially balanced. Any tendency that there may be to rotate, will be toward horizontal position and not to the upset position.

As an attachment to the structure for use, for example to lift engines from or onto place in a vehicle, I have mounted a horizontal boom 80 at one corner as shown in Fig. 2. This is supported from the upper end of a vertical shaft 82 that is rotatable in bearings 83—83 fixed in vertically spaced relationship on the corner post 10. A traveling block 85 is mounted on the boom arm 80 and this is equipped with a hook 86 to which lifting tackle can be attached. The arm is of such length that it can be swung directly over the engine of a vehicle as placed on the frame 40. When the engine has been lifted, the boom can be swung so as to carry it to a location at the side of the rack.

Having thus described my invention, what I claim as new therein and desire to secure by Letters Patent, is:

1. A vehicle lifting and turning means comprising upright opposite end frames, a lifting beam associated with each of the said end frames, means for raising and lowering said lifting beams along their respective frames, a vehicle lifting frame extended between the said end frames and adapted to be disposed at a horizontal level for the running of a vehicle thereonto, supporting trunnions on the opposite ends of the vehicle lifting frame rotatably mounted by the said lifting beam for the turning of the lifting frame about the axial lines of the trunnions; one of said trunnions being at a level substantially above that of the other.

2. A vehicle lifting and turning means comprising upright opposite end frames, a vehicle lifting frame extended between the said opposite end frames and adapted for disposition at a horizontal level between them to permit the driving of a vehicle thereonto, lifting beams associated with the opposite end frames for guided movement upwardly and downwardly therealong, means for the controlled raising and lowering of said beams along their respective frames, trunnions extended from the opposite ends of the said vehicle lifting frame and rotatably mounted by the corresponding lifting beams, one of the trunnions being substantially at the level of the vehicle lifting frame and the other being located substantially thereabove, and means attached to one of the beams and to the vehicle lifting frame and operable to cause the lifting frame to be turned about the axial line of the trunnions.

3. A device as in claim 2 wherein each of the opposite end frames comprises laterally spaced posts, and said lifting beams extend horizontally between the posts and are supported by their lifting means for turning about their longitudinal axes; and wherein the said trunnions are loosely contained in bearings on said beams to permit the turning movement of the vehicle lifting frame about the line of the trunnions.

4. In an automobile lift of the character described; opposite end supports adapted to be raised and lowered, a vehicle lifting frame adapted to be disposed flatly on a floor between the supports for the running of a vehicle thereonto for lifting, trunnions extended from the opposite ends of the said lifting frame and mounted for support and turning on said opposite end supports; one of said trunnions being in the plane of the lifting frame and the other being supported from the frame in a plane at a substantially higher lever than that of the other trunnion.

5. An automobile lifting and turning means comprising opposite end frames, each comprising laterally spaced posts, and screw shafts mounted by and extended along the insides of said posts, bearings threaded onto the shafts, and means for rotating the shafts of the same end frame in unison to cause the bearings to be raised and lowered together therealong, cross-beams extended between the bearings, and pivotally supported at their ends therefrom for the turning of the beams about their longitudinal axes, a vehicle lifting frame extended between the opposite end frames, and adapted to rest flatly in a floor between them for the running of an automobile into position thereover, a trunnion extended from the lifting frame at one end thereof, a bearing mounted on the corresponding beam and containing the trunnion therein, a trunnion extended from the opposite end of the frame, but at a substantially higher level than the first mentioned trunnion, a bearing on the corresponding cross beam revolubly containing the trunnion therein, and an adjusting shaft rotatably fixed to one of the cross beams and operatively connected with the vehicle lifting frame to rotatably adjust it about the axial line of its supporting trunnions.

CARLYLE HALL.

No references cited.